(12) United States Patent
Bryce

(10) Patent No.: US 7,425,011 B2
(45) Date of Patent: Sep. 16, 2008

(54) TRAILER HITCH

(76) Inventor: Norman K. Bryce, 3610 S. 2700 East, Salt Lake City, UT (US) 84109

( * ) Notice: Subject to any disclaimer, the term of this patent is extended or adjusted under 35 U.S.C. 154(b) by 0 days.

(21) Appl. No.: 11/592,929

(22) Filed: Nov. 3, 2006

(65) Prior Publication Data

US 2008/0106063 A1    May 8, 2008

(51) Int. Cl.
*B60D 1/44* (2006.01)

(52) U.S. Cl. ...................... 280/447; 280/499

(58) Field of Classification Search ............. 280/446.1, 280/447, 455.1, 456.1, 478.1, 479.1, 499
See application file for complete search history.

(56) References Cited

U.S. PATENT DOCUMENTS

| | | | | |
|---|---|---|---|---|
| 1,438,831 A | * | 12/1922 | Jones | 280/499 |
| 1,918,382 A | * | 7/1933 | Cook | 172/677 |
| 2,025,820 A | * | 12/1935 | Miller | 280/447 |
| 2,036,993 A | * | 4/1936 | Allen | 280/446.1 |
| 2,092,597 A | * | 9/1937 | Benjamin et al. | 280/447 |
| 2,144,295 A | * | 1/1939 | McGregor | 280/447 |
| 2,414,248 A | * | 1/1947 | Townsend | 280/447 |
| 2,768,837 A | * | 10/1956 | Prater | 280/499 |
| 2,788,226 A | * | 4/1957 | Malone | 280/447 |
| 2,879,079 A | * | 3/1959 | Edwards | 280/446.1 |
| 2,947,551 A | * | 8/1960 | Reimers | 280/499 |
| 3,487,448 A | | 12/1969 | Stemmerman et al. | |
| 3,556,558 A | | 1/1971 | McKee | |
| 3,787,068 A | | 1/1974 | Miller | |
| 4,019,754 A | | 4/1977 | Hinckley | |
| 4,060,255 A | * | 11/1977 | Zimmerman | 280/478.1 |
| 4,398,617 A | | 8/1983 | Crabb | |
| 4,420,169 A | | 12/1983 | Taylor | |
| 4,575,110 A | * | 3/1986 | Kuhn et al. | 280/446.1 |
| 4,722,542 A | | 2/1988 | Hensley | |
| 5,167,423 A | | 12/1992 | Hall, Jr. | |
| 5,660,409 A | | 8/1997 | Hensley | |
| 6,073,953 A | * | 6/2000 | Kendall | 280/447 |
| 6,305,705 B1 | | 10/2001 | Cook | |
| 7,134,679 B2 | * | 11/2006 | Krstovic | 280/479.1 |

\* cited by examiner

*Primary Examiner*—Lesley D. Morris
*Assistant Examiner*—Daniel Yeagley
(74) *Attorney, Agent, or Firm*—Thorpe North & Western LLP

(57) ABSTRACT

A trailer hitch which will resist fishtailing and increase stability of the towing vehicle-trailer combination is mounted at the rear of the towing vehicle. The hitch includes a pivot connector, such as a ball, which receives the mating end of a tongue extending from the trailer to be towed. However, the rotation of the trailer about the pivot connector is resisted, but not prevented, and the trailer tongue is biased to a preset position with respect to the pivot connector. The trailer hitch can provide limited lateral movement of the pivot connector to move the pivot point forwardly of the rear of the towing vehicle. The resistance to pivoting of the trailer with respect to the pivot connector results first in lateral movement of the pivot connector before resisted pivoting about the pivot connector. Lateral movement of the connector can be promoted during certain conditions and resisted during other conditions.

23 Claims, 8 Drawing Sheets

Figure 2:
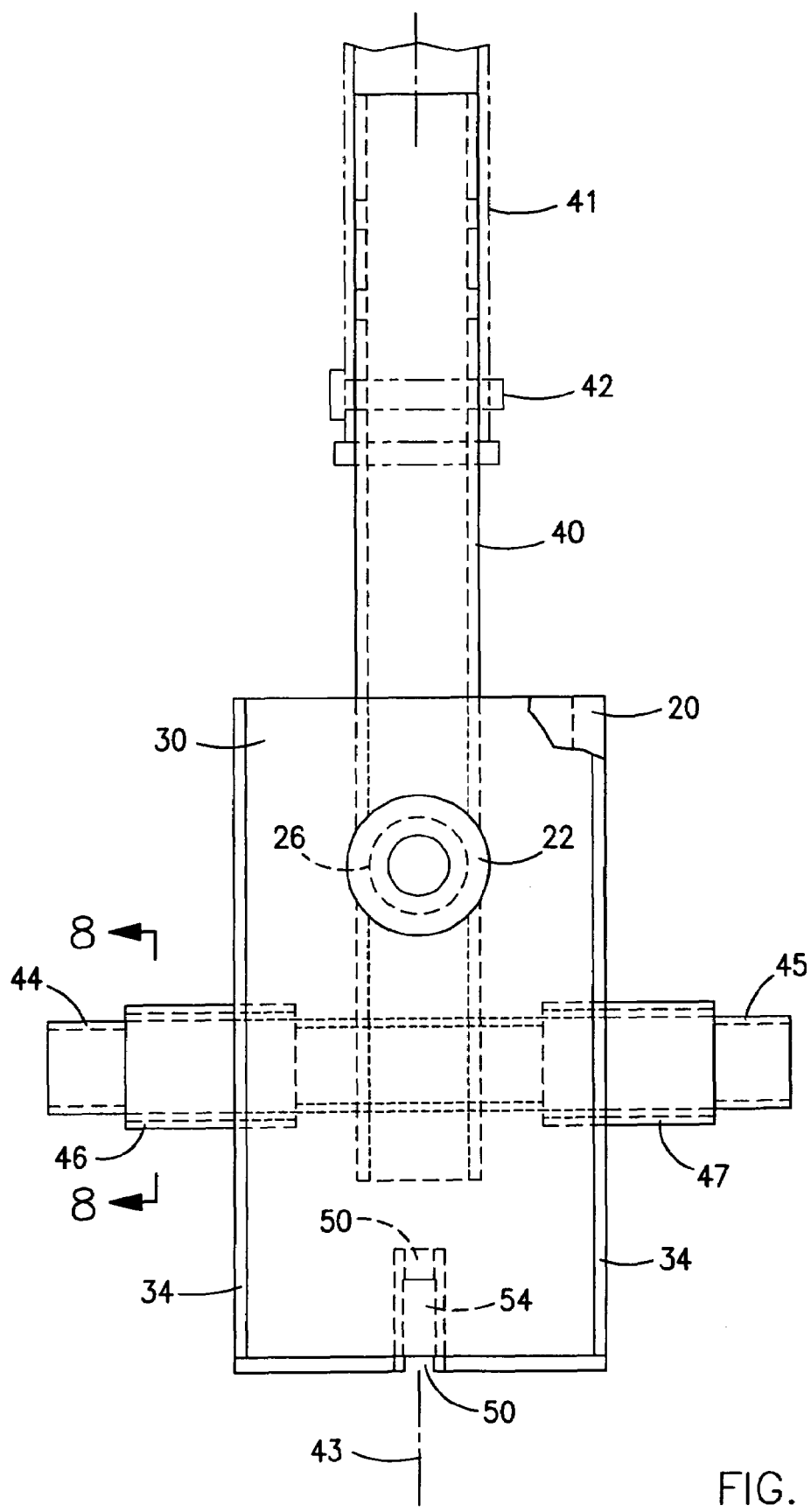

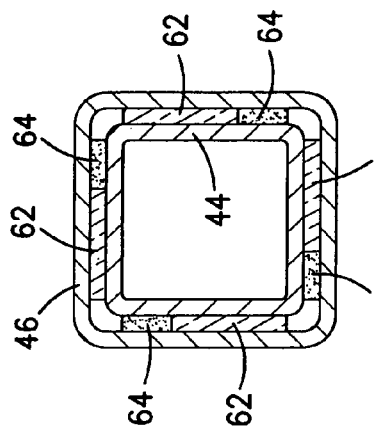
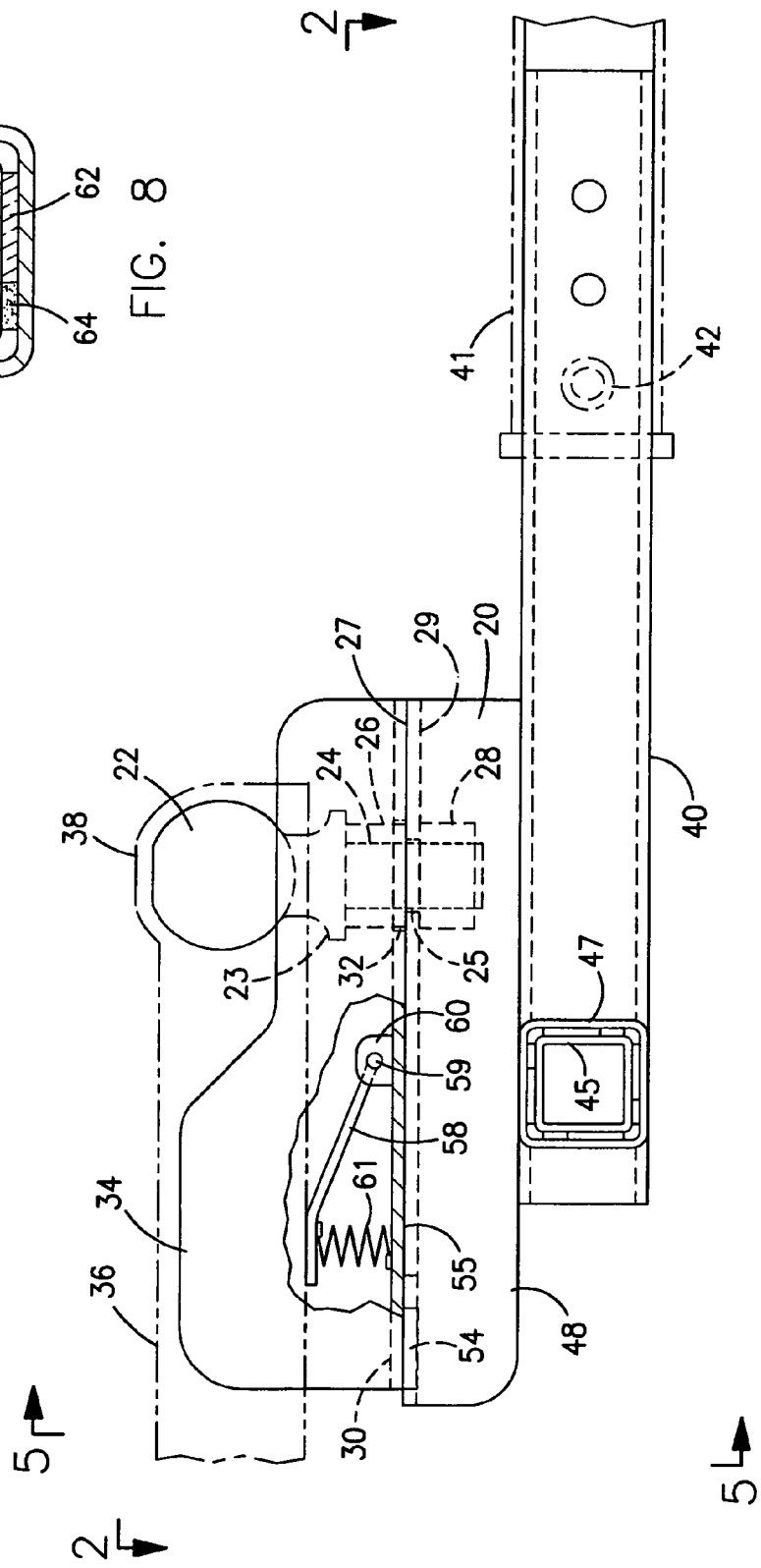
FIG. 8
FIG. 1

TRAILER HITCH

BACKGROUND OF THE INVENTION

1. Field

The invention is in the field of trailer hitches.

2. State of the Art

Trailer hitches generally used with automobiles and small trucks are usually attached to the rear frame of the towing vehicle with a universal pivot attachment, usually a ball, spaced behind the towing vehicle to pivotally receive thereon a mating attachment, such as a socket, on a tongue extending from the body of the trailer to be towed. This allows easy attachment of the trailer to the towing vehicle and provides good tracking of the trailer around corners and curves negotiated by the towing vehicle.

One problem in towing a trailer is fishtailing. Fishtailing is side to side turning and swaying of the trailer with the trailer pivoting about its pivot connection to the vehicle behind the vehicle. Fishtailing happens primarily with systems having the pivot point of the hitch located behind the towing vehicle between the trailer and the towing vehicle. As the trailer moves from side to side of the towing vehicle, it puts side to side force on the pivot connection between the towing vehicle and the trailer. With the attachment of the hitch to the rear of the towing vehicle body, this tends to cause the rear of the towing vehicle body to start to move or sway from side to side which can lead to loss of control of the vehicle. This is a cyclic motion and frequently causes loss of control of the towed trailer and the towing vehicle. Moving the effective pivot point between the trailer and towing vehicle to the center of the rear axle of the towing vehicle, or ahead of the rear axle to a point between the front and rear axles of the towing vehicle, usually eliminates most of the fishtailing. It is difficult to move or sway a vehicle body to the side in relation to the axles of the vehicle with a side force applied over an axle or between axles. However, it is easier to sway a vehicle body to the side when the side force is applied at the front or rear of the body. A fifth wheel trailer attachment moves the pivot point between the trailer and vehicle over the rear axle of the towing vehicle and provides better stability for the vehicle and trailer combination. However, fifth wheel hitches are not practical for towing trailers with automobiles and small trucks.

Attempts have been made to move the pivot point of a trailer hitch to the rear axle of the towing vehicle. For example, U.S. Pat. No. 5,167,423 shows a trailer hitch attached to the rear axle of a towing vehicle with a drawbar pivotally attached adjacent the rear axle. The drawbar is attached to the trailer in a manner to prevent pivotal movement between the drawbar and the trailer with all pivotal movement occurring at the pivotal mounting of the drawbar adjacent the rear axle of the towing vehicle. While this type of trailer hitch is effective in reducing fishtailing and providing more stability to the vehicle-trailer combination, it has the disadvantage that the tracking of the trailer is changed so that the trailer turns a shorter radius than the rear of the vehicle so cuts corners. Most vehicles on roads, highways, and freeways steer by turning the front wheels of the vehicle. The natural geometry of this steering system causes the rear wheels of the vehicle to track inside the radius of the curve paths of the front wheels. With a trailer pivoted to the towing vehicle adjacent the rear axle, the trailer will track significantly inside the tracks of the rear wheels of the vehicle. The true tracking pivot point for a trailer is midway between the towing vehicle rear wheels and the trailer wheels. Therefore, for tracking purposes, it is advantageous to maintain the trailer pivot point behind the towing vehicle. Also, with the hitch attached to the rear axle of the towing vehicle, the drawbar has to be supported vertically, either by attachment to the rear of the vehicle or to the trailer tongue, so that the trailer connection does not drag on the ground. Further, the rigid attachment of the drawbar to the trailer tongue makes attaching and detaching of the trailer more difficult.

Several trailer hitches have been designed to keep the connection between the towing vehicle and the trailer behind the towing vehicle as with the conventional hitch to provide similar tracking of the trailer and ease of attaching the trailer, but to move the effective pivot point forwardly of the rear of the towing vehicle toward the towing vehicle axle. These hitches generally do not allow any pivotal movement of the trailer tongue about the point of connection to the towing vehicle, although at least one of these hitches allows free pivotal movement of the trailer tongue about the point of connection as with the usual ball and socket connection. Examples of such trailer hitches are shown in U.S. Pat. Nos. 4,019,754, 4,722,542, 5,660,409, 6,305,705, and 3,787,068. However, the need for an improved trailer hitch remains.

SUMMARY OF THE INVENTION

According to the invention, a trailer hitch is mounted in normal manner at the rear of the towing vehicle by an attachment means, such as an attachment bar that can be inserted into the usual hitch receiver mounted at the rear of the towing vehicle. The hitch includes a universal pivot connector, such as a ball, which receives the mating end of a tongue extending from the trailer to be towed, such as by a socket which fits over the ball in usual manner. However, the rotation of the trailer about the universal pivot connector, e.g., rotation of the socket with respect to the ball, is resisted, but not prevented, by a resistance means which urges or biases the orientation of the trailer tongue to a preset position with respect to the universal pivot connector. In this way, rotation of the trailer with respect to the towing vehicle is allowed to the extent necessary during towing to allow the vehicle-trailer combination to negotiate curves and turns and to allow maneuvering of the trailer, but the resistance to such rotation resists fishtailing of the trailer and transfer of swaying forces to the towing vehicle.

The trailer hitch can also provide for limited lateral movement of the universal pivot connector with respect to the towing vehicle in a manner to move the effective pivot point for pivoting of the trailer with respect to the towing vehicle during normal highway turning of the towing vehicle-trailer combination forwardly of the rear of the towing vehicle. This simulates the positioning of the pivot point of a fifth wheel trailer hitch system. In such case, the resistance to pivoting of the trailer with respect to the universal pivot connector will result first in lateral movement of the universal pivot connector with respect to the vehicle before resisted pivoting of the trailer with respect to the universal pivot connector takes place. This results in initial turning or pivoting of the trailer with respect to the towing vehicle about an effective pivot point ahead of the rear of the towing vehicle (simulation of the fifth wheel system) with any additional pivoting necessary to make a turn occurring about the pivot connector. Means can also be provided to promote lateral movement of the universal pivot connector with respect to the vehicle during certain conditions, such as during forward towing of the trailer, and to resist such lateral movement during other conditions, such as slowing down or braking of the towing vehicle or backing up of the towing vehicle.

In one embodiment of the invention, a trailer hitch is mounted in normal manner at the rear of the towing vehicle by an attachment means, such as an attachment bar that can be inserted into a usual hitch receiver mounted at the rear of the towing vehicle. A hitch base plate is mounted through a track means for limited lateral movement with respect to the attachment means. The track means may be a straight or an arcuate bar or straight or arcuate bars secured to the attachment means, with sleeves secured to the base plate slidably mounted on the track. Alternately, the track can be secured to the base plate rather than to the attachment means with sleeves secured to the attachment means to slidably mount the attachment means to the track. In either case, the hitch base plate is slidably mounted to the attachment means so can slide along the track laterally in either direction away from the longitudinal axis of the towing vehicle.

A universal pivot connector, such as a ball, is connected to the hitch base plate and receives a mating socket at the end of a tongue extending from the trailer to be towed. The resistance means takes the form of a pivot plate pivotally mounted to the universal pivot connector which can pivot at least partially about the pivot connector, and which also receives a portion of the tongue of the trailer to be towed so that the pivot plate pivots with the trailer tongue around the pivot connector. The pivot plate is mounted with respect to the base to resist rotational movement with respect to the base and to be normally urged to a centered position with respect to the base, but can rotate with respect to the base against the urge or bias to be centered. With this arrangement, the pivot plate and trailer tongue will generally remain substantially centered with respect to the base during normal highway turning of the towing vehicle and trailer, the base sliding along the track during such normal turning to provide an effective pivot point positioned ahead of the rear of the towing vehicle and toward the rear axle of the towing vehicle. For sharper turns than can be handled by the track means, the pivot plate will turn with respect to the base against the bias to centered position to uncentered positions. This allows the trailer to pivot with respect to the universal pivot connector behind the vehicle.

The attachment means can be an attachment bar that fits into a usual hitch receiver to attach the hitch to the towing vehicle. The attachment bar can extend straight back from the hitch receiver along the longitudinal axis of the vehicle. The track means can be made up of one or more straight track bars that extend transversely from opposite sides of the attachment bar to form a straight track secured to the attachment bar substantially transverse to the longitudinal axis of the towing vehicle, or can be made up of one or more arcuate bars that extend from opposite sides of the attachment bar to form an arcuate track extending outwardly from the longitudinal axis of the towing vehicle. In an alternate embodiment, the attachment means is also an attachment bar that fit into a usual hitch receiver to attach the hitch to the towing vehicle, but includes additional attachment bar extensions attached to the attachment bar that extend outwardly and rearwardly from the rearward end of the attachment bar at angles to the attachment bar. The track is then made up of one or more track bars, either straight or arcuate, that extend between the attachment bar extensions. The base is slidably mounted on the track to slide back and forth along the track as the towing vehicle turns with respect to the trailer.

In one embodiment of the base and pivot plate arrangement, the pivot plate is pivotally secured to the universal pivot connector mounted on the base and rests on the base. The base includes a V-shaped slot or V-shaped receiving surface and the pivot plate includes a projection received in the slot or V-shaped receiving surface. The projection may form a complementary V-shaped surface received in the slot or V shaped receiving surface. Any rotation of the pivot plate in relation to the base will cause a displacement of the projection with respect to the slot or V shaped receiving surface of the base and, because of the sloped sides of the V, gravity or other forces tending to push the pivot plate and base together, will urge or bias the pivot plate to a centered position on the base. A mechanism may be provided to apply a downward force to the pivot plate against the base. This can be a flap hinged to the top of the pivot plate with a spring urging the flap and pivot plate apart. The flap is adapted to abut the bottom of the trailer tongue when the trailer tongue is received between the side flanges of the pivot plate. When abutting the bottom of the trailer tongue, the spring will urge the pivot plate downwardly toward the base.

The base or attachment means may be mounted on the track by one or more sleeves which slidably surround the bars forming the track. Movement along the track can be promoted by slip promoting materials, such as some types of plastic, positioned between the sleeves and the track to promote sliding of the sleeves along the track. Movement along the track can be resisted by slip resistant material positioned between the sleeve and the track to resist sliding of the sleeve along the track. The different materials may be positioned to control sliding of the sleeve along the track in desired ways during certain towing conditions. For example, when the track is secured to the attachment means, the slip promoting material may be positioned along the forward side of the track so that when the towing vehicle is pulling the trailer, i.e., the force between the track and sleeve is along the forward side of the track and sleeve, the base slides easily along the track. The slip resistant material may be positioned along the rearward side of the track so that when the towing vehicle slows down, such as during braking, i.e., the force between the track and sleeve is along the rearward side of the track and sleeve, the base resists sliding along the track. Various other arrangements of slip promoting and slip resisting materials can be made to provide desired characteristics to the trailer hitch.

THE DRAWINGS

Figure 3:
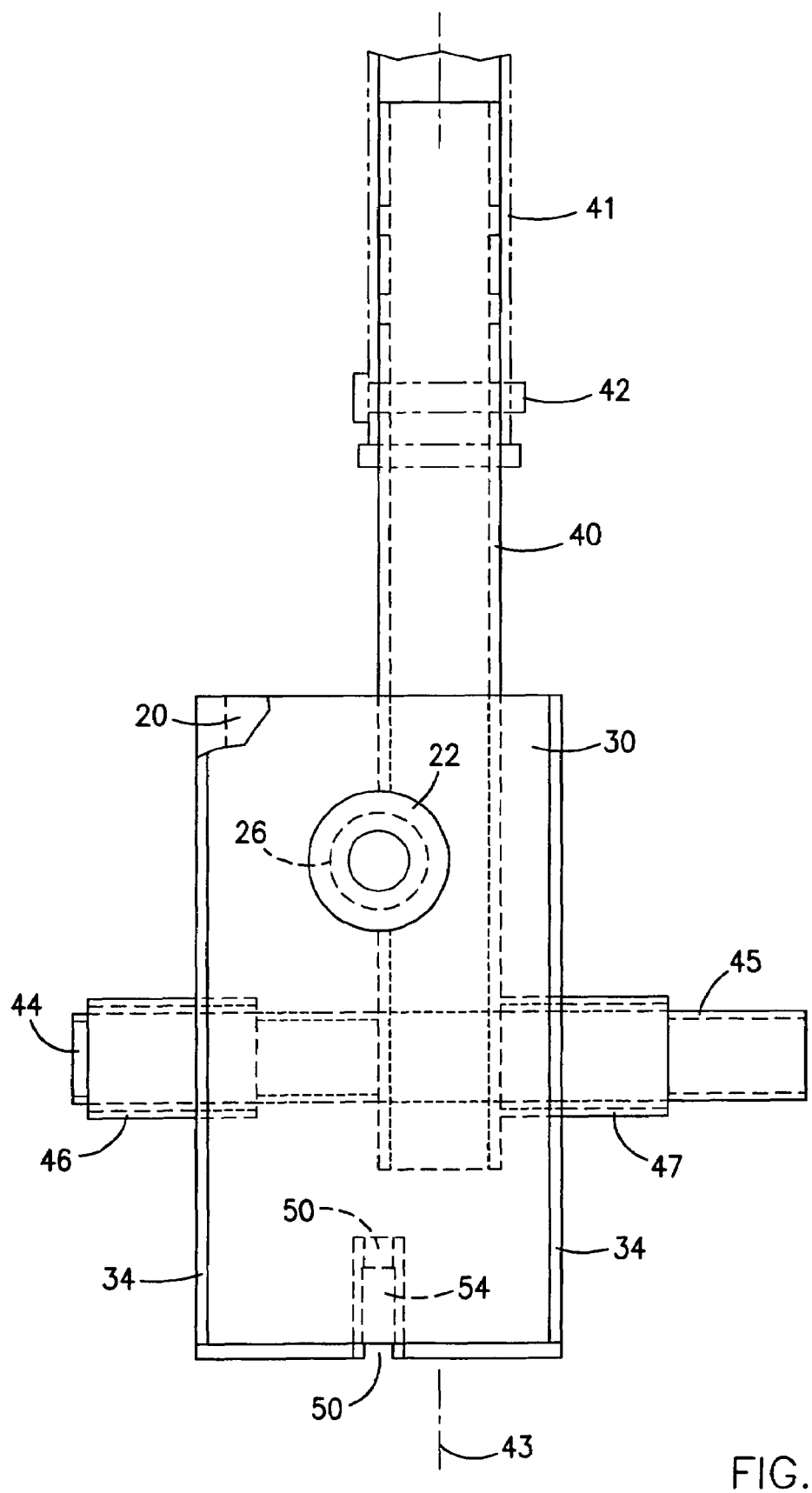
Figure 4:
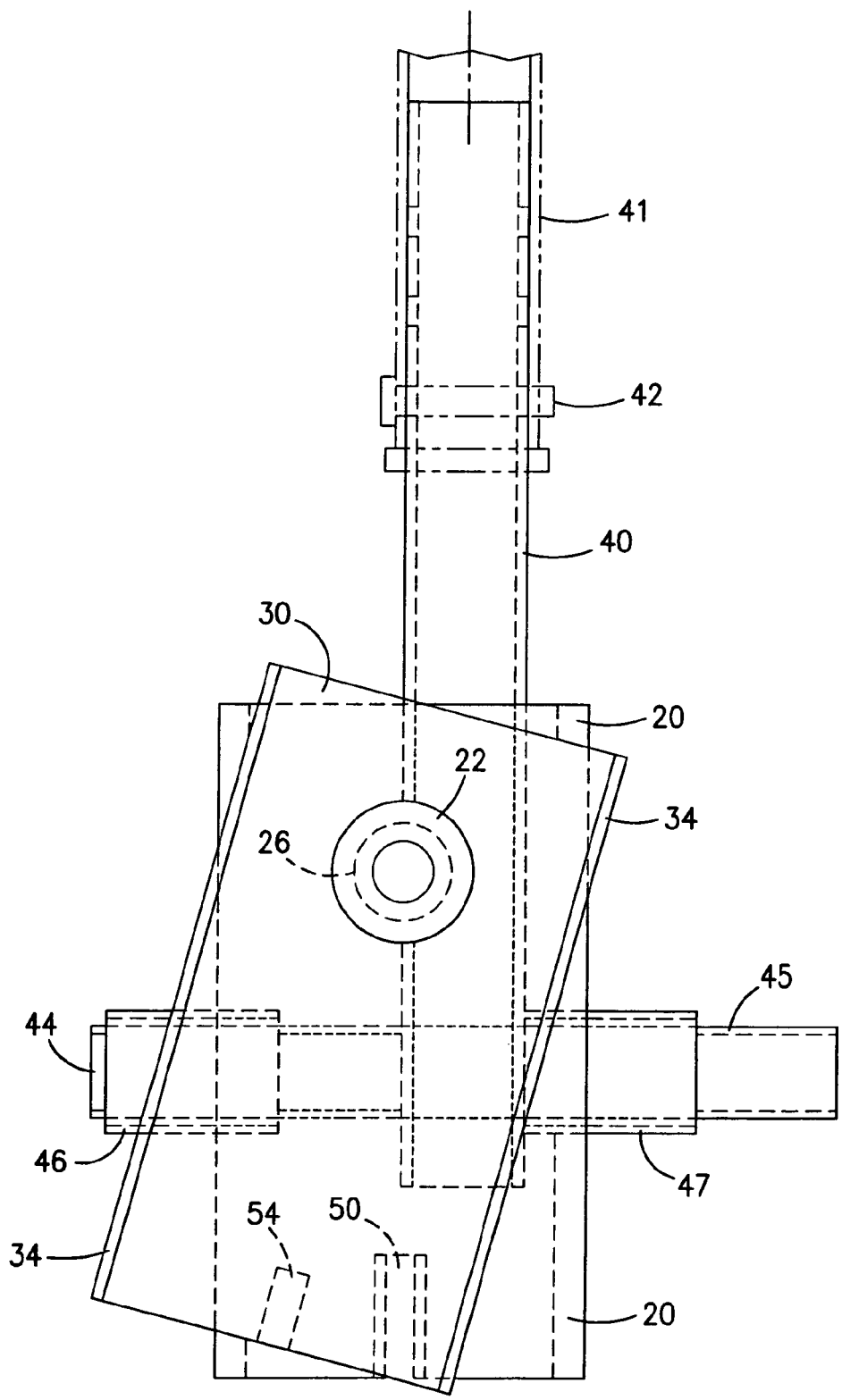
Figure 5:
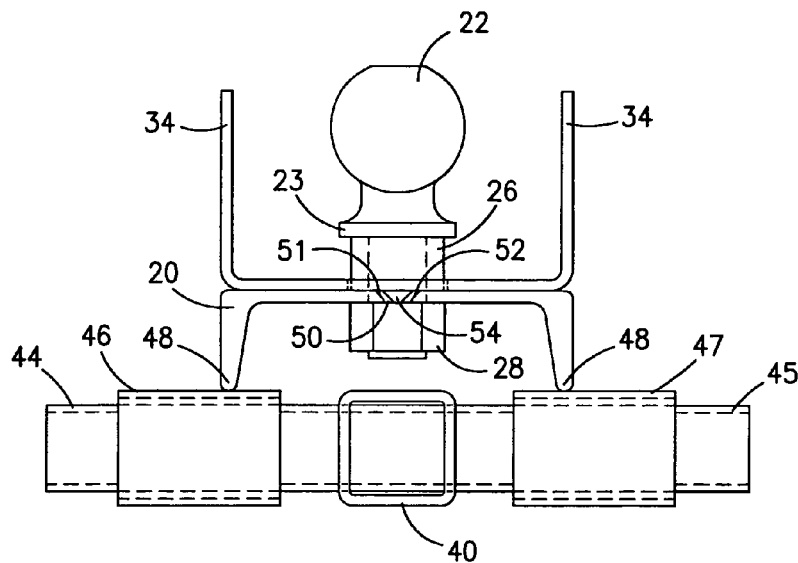
Figure 7:
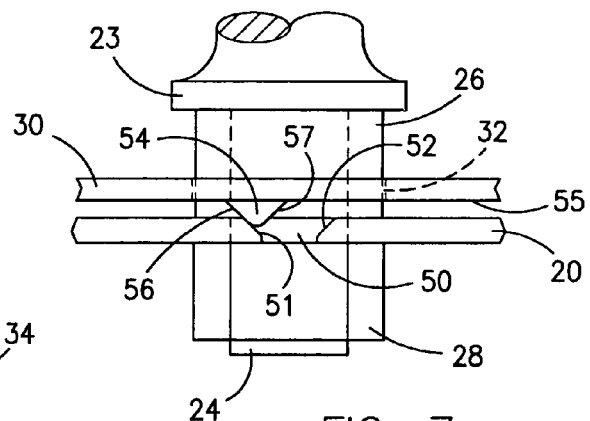
Figure 6:
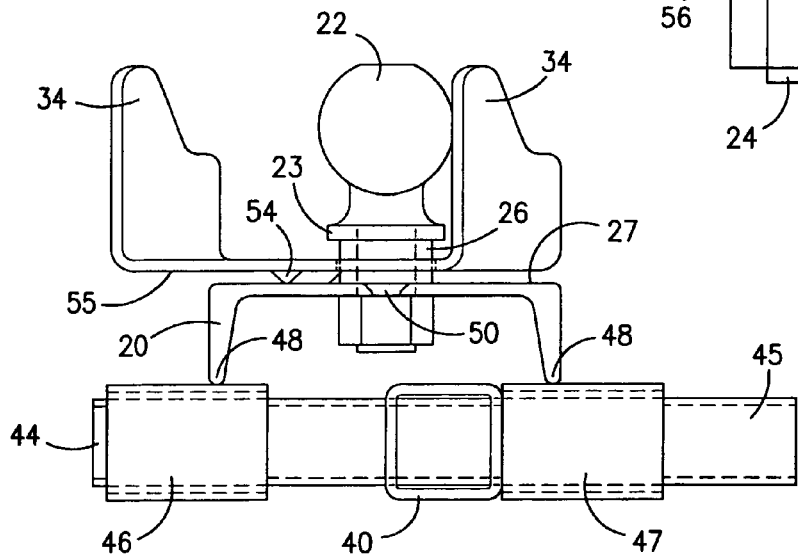
Figure 9:
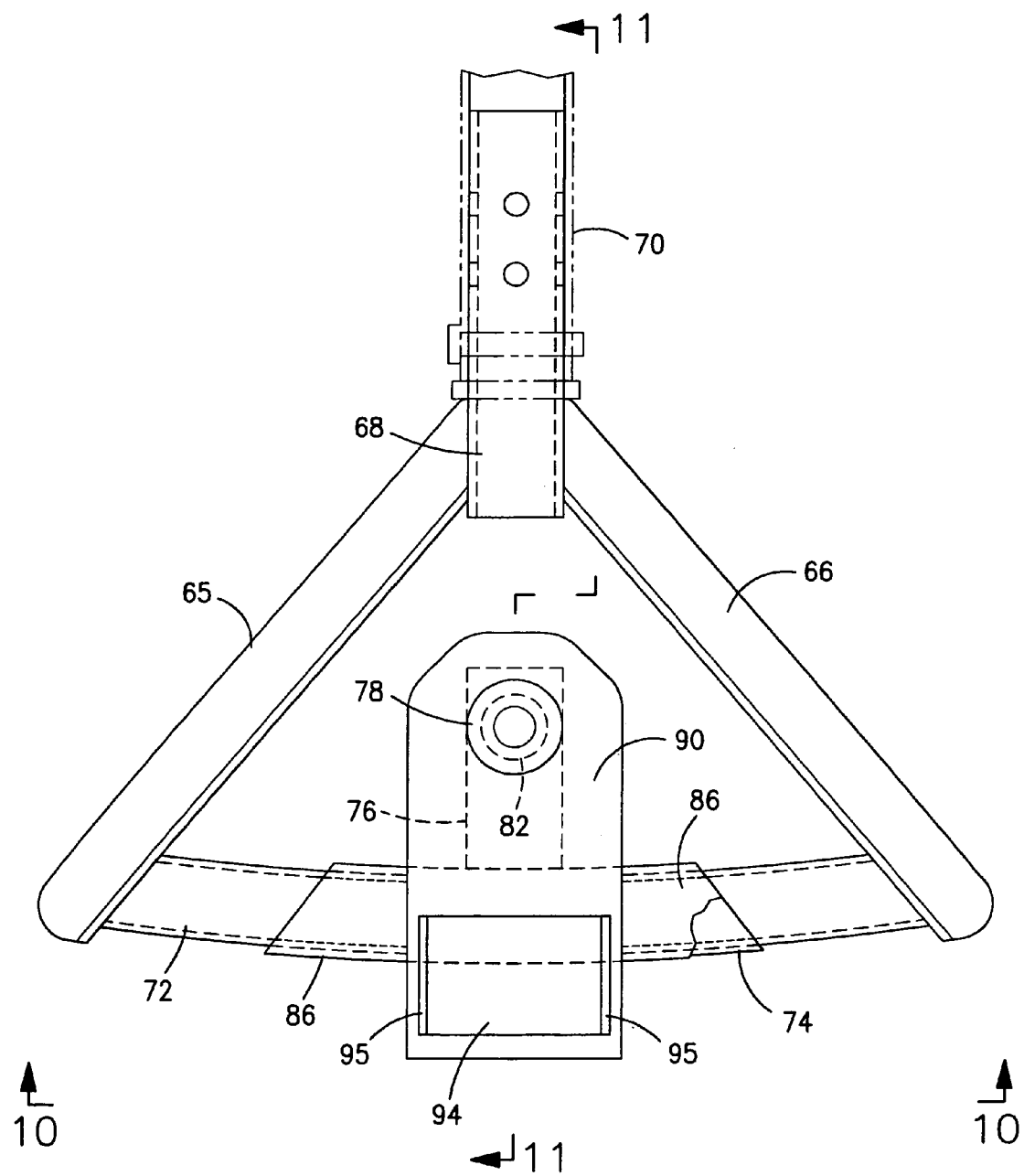
Figure 10:
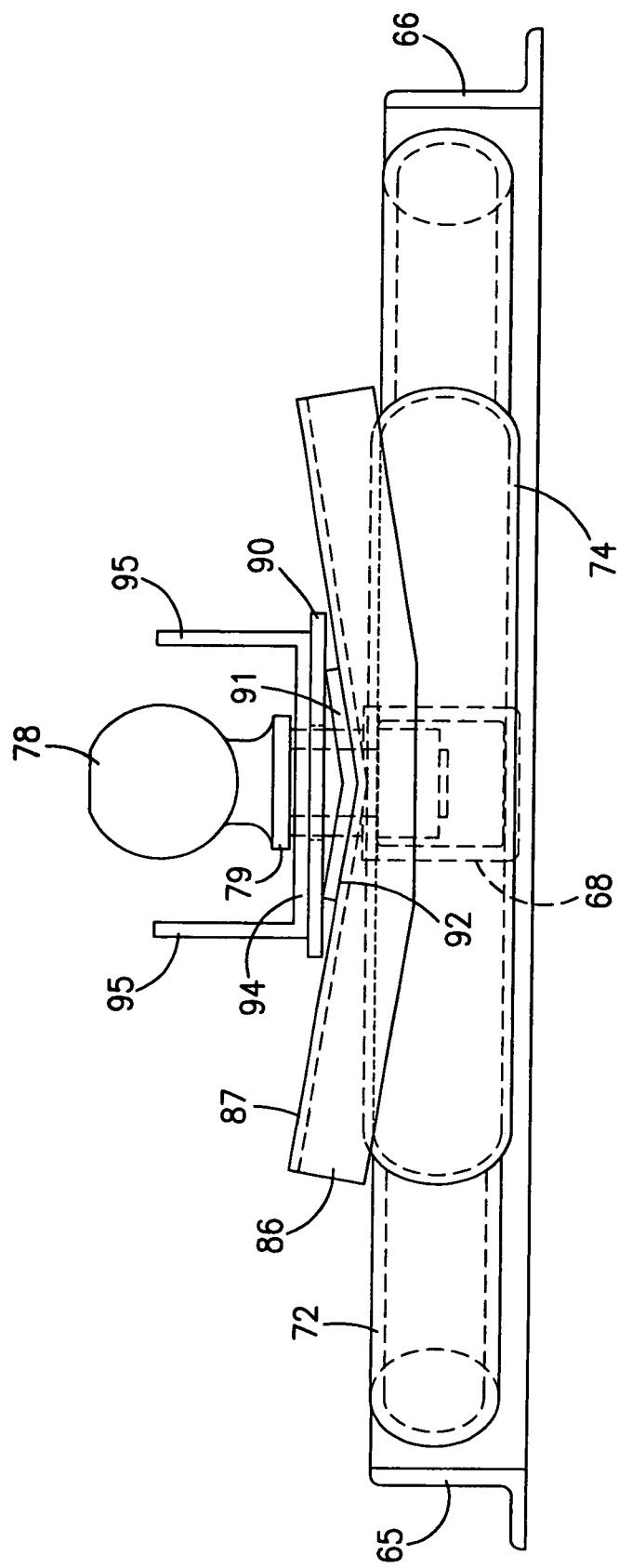
Figure 11:
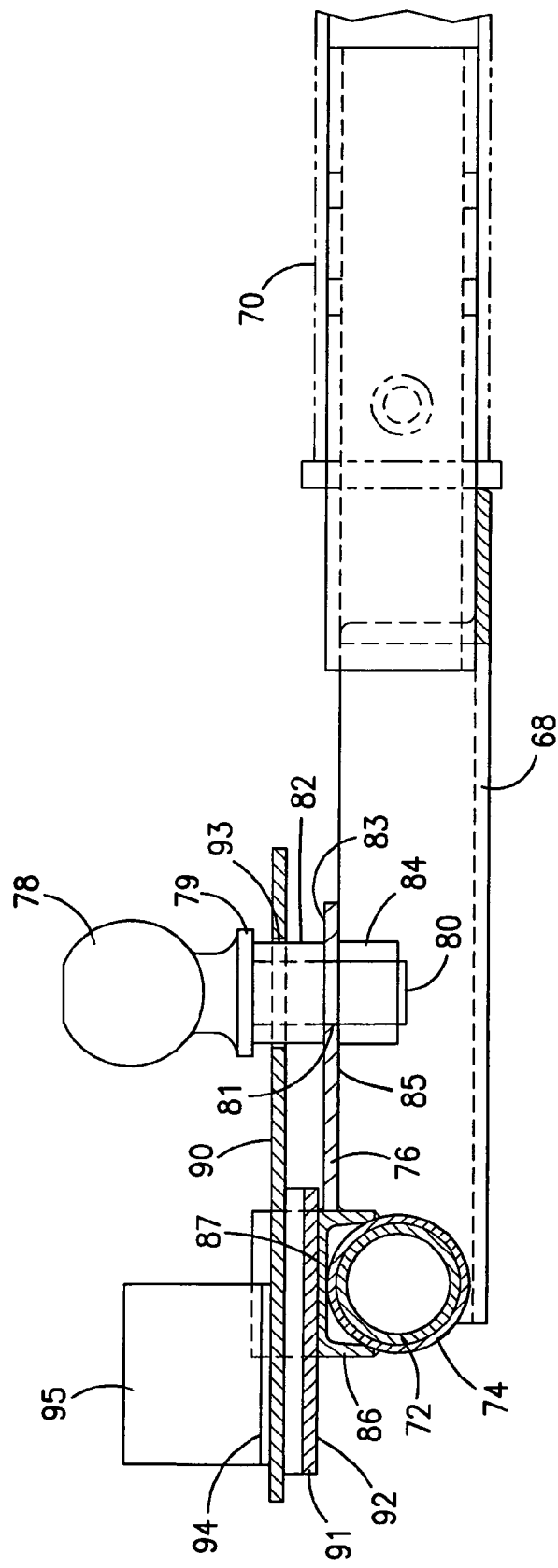

In the accompanying drawings, which show the best mode currently contemplated for carrying out the invention:

FIG. 1 is a side elevation of a trailer hitch of the invention;

FIG. 2, a top plan view of the trailer hitch with the base centered on the track and the pivot plate centered with respect to the base;

FIG. 3, a top plan view similar to that of FIG. 2, but showing the base slid to one side along the track;

FIG. 4, a top plan view similar to that of FIG. 3 showing the base slid to one side of the track, and also showing the pivot plate pivoted in relation to the base;

FIG. 5, a rear elevation of the hitch with the base centered on the track and the pivot plate centered with respect to the base as shown by FIG. 2;

FIG. 6, a rear elevation of the hitch with the base slid to one side of the track and the pivot plate pivoted in relation to the base as shown by FIG. 4;

FIG. 7, a fragmentary rear elevation of the hitch similar to that of FIGS. 5 and 6, but showing the pivot plate pivoted to a lesser degree in relation to the base than shown in FIG. 6;

FIG. 8, a vertical section through a sleeve mounting the base to the track taken along the line 8-8 of FIG. 2;

FIG. 9, a top plan view of an alternate embodiment of the invention showing a different track and track mounting arrangement;

FIG. 10, a rear elevation of the hitch of FIG. 9, taken on the line 10-10 of FIG. 9, with the base centered on the track and the pivot plate centered with respect to the base as shown by FIG. 9; and FIG. 11, a longitudinal section of the hitch of FIG. 9, taken on the line 11-11 of FIG. 9.

DETAILED DESCRIPTION OF THE ILLUSTRATED EMBODIMENTS

Referring to the embodiment of FIGS. 1-8, a trailer hitch of the invention includes a base 20 with a universal pivot connector in the form of the conventional trailer hitch ball 22 with ball base 23 secured to base 20 by the usual threaded stud 24 extending from ball base 23 of hitch ball 22 and passing through a receiving hole 25 in base 20, see FIGS. 1 and 5-7. A sleeve 26 is positioned around the upper portion of the stud 24 between the bottom of ball base 23 and the upper surface 27 of base 20 to raise hitch ball 22 above the upper surface 27 of base 20. A nut 28 is tightened against the lower surface 29 of base 20 to sandwich base 20 between nut 28 and sleeve 26 to secure hitch ball 22 to base 20.

Pivot plate 30 rests on the upper surface 27 of base 20 and is pivotally mounted to pivot about connector hitch ball 22 by passing sleeve 26 through a receiving hole 32 in pivot plate 30. Sleeve 26 then acts as a pivot pin or pivot shaft about which the pivot plate 30 can rotate. Pivot plate 30 includes two upright side flanges 34 which are spaced apart to receive therebetween the tongue 36, FIG. 1, of a trailer to be towed, not shown, when ball receiving socket 38 at the end of tongue 36 is coupled to hitch ball 22 in normal manner. With trailer tongue 36 received between side flanges 34, pivot plate 30 will rotate with trailer tongue 36 about ball 22 any time that trailer tongue 36 rotates about ball 22 when being towed. Since trailer tongues may be of different widths, and it is desirable to have pivot plate 30 rotate with the tongue without substantial free play, with smaller width tongues it will be desirable to be able to adjust the width which receives the trailer tongue between the side flanges 34. Various means to adjust the width and provide a relatively close fit of the trailer tongue between the side flanges 34 can be used, such as spacers placed on the inside of each of the side flanges 34 or adjustable plates on the inside of the side flanges 34. To allow pivot plate 30 to move up and down with respect to base 20 and ball 22, sleeve 26, slidably received through receiving hole 32 in pivot plate 30, will space ball 22 and ball base 23 a sufficient distance above base 20 so that pivot plate 30 can slide up and down a desired distance along sleeve 26 between base upper surface 27 and the bottom of ball base 23.

Base 20 is secured to a towing vehicle, not shown, through an attachment means secured to the rear portion of the towing vehicle. As shown in FIGS. 1-6, the attachment means is an attachment bar 40 adapted to be received in normal manner by the usual hitch receiver 41, FIGS. 1-4, attached to the rear of a towing vehicle. Attachment bar 40 is held in hitch receiver 41 by pin 42 in normal manner. Hitch receiver 41 is normally aligned with the longitudinal center axis 43 of the towing vehicle. Attachment bar 40 extends straight out of hitch receiver 41 rearwardly along the longitudinal center axis 43 of the towing vehicle. A track made up of track segments 44 and 45 extends outwardly on opposite sides from the attachment bar 40, and base 20 is slidably mounted on track segments 44 and 45 by sleeves 46 and 47, respectively, attached to the bottom 48 of base 20. In this manner, base 20 is allowed to slide back and forth a limited distance along track segments 44 and 45 to either side laterally of attachment bar 40 and of longitudinal center axis 43 of the towing vehicle. FIGS. 2 and 5 show base 20 centered on the track with base 20 and hitch ball 22 aligned with attachment bar 40 and with the longitudinal axis 43 of the towing vehicle. FIGS. 3, 4, and 6 show base 20 slid to the limit of its lateral travel along the track to the left of the of attachment bar 40 and longitudinal center axis 43 of the towing vehicle with sleeve 47 on track segment 45 abutting against the right side of attachment bar 40 to stop movement along the track in the direction to the left. Movement of base 20 laterally to the right would be similar with movement of sleeve 46 along track segment 44 stopped by abutting the left side of attachment bar 40.

Pivot plate 30 is mounted to rest on base 20 as shown in FIGS. 1, 5, 6, and 7, and the mounting is such as to bias or urge pivot plate 30 to a centered position with respect to base 20 as shown in FIGS. 2, 3, and 5. To accomplish this, base 20 includes slot 50 with sloping sides 51 and 52 which form a V-shaped slot. Pivot plate 30 includes a projection 54 projecting from the bottom surface 55 of pivot plate 30. Projection 54 can be an elongate bar, with or without sloping sides, but shown here with sloping sides 56 and 57, see FIG. 7, which fits into slot 50 when pivot plate 30 is centered with respect to base 20 as shown in FIGS. 2, 3, and 5. If projection 54 fits tightly into slot 50, no free relative rotation of pivot plate 30 with respect to base 20 will be allowed. Any rotation will move projection 54 up the sloped wall 51 or 52, respectively, depending upon the direction of rotation.

While pivot plate 30 will be urged downwardly toward base 20 by gravity or sometimes by contact with and the weight of trailer tongue 36, it will usually be desirable to provide a means for urging pivot plate 30 downwardly toward base 20 in order to ensure that pivot plate 30 will be urged to centered position under all or most towing conditions. For this purpose, a flap 58, FIG. 1, may be hinged to the top surface of pivot plate 30 by hinge pin 59 extending between ears 60 secured to the top surface of pivot plate 30. A spring 61 extends between flap 58 and pivot plate 30 to pivot flap 58 away from pivot plate 30. In use, with trailer tongue 36 mounted to hitch ball 22 and extending between side flanges 34, flap 58 will abut the bottom of the tongue 36 and spring 61 will force pivot plate 30 downwardly toward base 20. This downward force of pivot plate 30 against base 20 will then resist movement of projection 54 upwardly along either sloped slot wall 51 or 52, and once such movement up a sloped slot side wall has occurred, will urge movement of pivot plate 30 and projection 54 back down into slot 50. FIG. 7 shows relative rotation of pivot plate 30 with respect to base 20 such as to move projection 54 upwardly along sloped slot wall 51. Sloped projection surface 56 mates with and slides along sloped slot wall 51 as shown in FIG. 7. In the position shown in FIG. 7, any downward pressure or force on pivot plate 30 with respect to base 20 will tend to force projection 54 back into a centered position with respect to slot 50. In this way, pivot plate 30 is biased to a centered orientation or position with respect to base 20. This will ensure that pivot plate 30 is biased to centered position with respect to base 20. The strength of spring 61, the width and depth of projection 54, as well as the slope of the sides of the slot 50 will affect the force of the bias tending to move the pivot plate back to centered position. If projection 54 is not sized to fit tightly in slot 50, some small rotation of the pivot plate 30 with respect to base 20 will be allowed without any counteracting bias force. This allowed rotation will be the amount of rotation required to move a projection wall into engagement with a slot wall. The amount of such rotation allowed, if any, is selected to allow some small amount of turning of the trailer with respect to the towing vehicle without substantial resistance (some resistance will be offered by the friction of the pivot plate resting against the base plate) but will be small enough so as not to substantially affect or substantially interfere with the stabilizing effect of the hitch design.

Once projection 54 comes completely out of slot 50 so is resting on the upper surface 27 of base 20, as shown in FIGS. 4 and 6, pivot plate 30 is no longer urged back to centered position. However, any movement of the towing vehicle with respect to the towed trailer that will tend to align the two will move the pivot plate back toward centered position and as projection 54 gets to the edge of slot 50, centering will again be urged. The hitch will normally be designed so that projection 54 will not come completely out of slot 50 during turning of the trailer and towing vehicle during normal freeway and highway travel, but will only come out when necessary to negotiate sharp turns made at slow speeds and during slow speed maneuvering of the trailer such as backing the trailer into a parking or storage space.

To use the trailer hitch of the invention, the trailer hitch is attached to a towing vehicle by sliding the attachment bar 40 into the hitch receiver 41 and sliding pin 42 into place to hold the attachment means in the hitch receiver. The normal socket 38 at the end of the tongue 36 of the trailer to be towed is connected to the ball 22 in normal manner. The tongue 36 of the trailer will fit between the pivot plate side flanges 34 so that any rotation of the trailer tongue 36 with respect to hitch ball 22 will cause a similar rotation of pivot plate 30 with respect to base 20. Further, any resistance to rotation of pivot plate 30 with respect to base 20 as caused by the biasing of the pivot plate 30 to a centered position will also provide the same resistance to rotation of the trailer tongue with respect to hitch ball 22. This resistance to rotation or pivoting of the trailer tongue with respect to hitch ball 22 will resist, and in most cases prevent, fishtailing of the towed trailer. Further, in the illustrated embodiment, because of this resistance to rotation of the trailer tongue with respect to hitch ball 22, during use of the trailer hitch of the invention to pull a trailer, any turning of the towing vehicle with respect to the towed trailer, after any allowed rotation due to the fit of the projection 54 in slot 50, will first usually cause lateral movement of the base 20 along the track rather than rotation of the trailer tongue with respect to the hitch ball 22. The resistance to rotation of the trailer tongue about hitch ball 22 and the movement of the base 20 and hitch ball 22 along the track projects the effective pivot point between the trailer and towing vehicle forwardly of hitch ball 22 and forwardly of the rear of the towing vehicle toward the rear axle or even ahead of the rear axle of the towing vehicle. This increases the stability of the vehicle-trailer combination and reduces, and in most cases eliminates, the chances of the trailer fishtailing. In highway travel, the curves of the highway, and thus the turning of the towing vehicle with respect to the towed trailer, will usually only cause movement of the base along the track. With tighter turns, the trailer tongue and pivot plate will rotate to the extent that the projection 54 will interact with the slot walls 51 or 52 so that rotation will be resisted by the bias of the pivot plate 30 and pivot plate 30 will be urged to centered position with respect to the base 20. Where sharper turns are encountered, such as in parking or otherwise maneuvering the trailer, rotation of the pivot plate 30 with respect to base 20 can result in projection 54 rotating completely out of slot 50 as shown in FIGS. 4 and 6. However, as normal towing of the trailer resumes, the towing vehicle and trailer will straighten out and the pivot plate 30 will move to centered position with regard to base 20 and operate as described above for normal towing with the bias toward keeping the pivot plate, and thus the trailer tongue, in centered relationship with the base, and with most turning being accommodated by the sliding of the base 20 along the track.

While in normal towing of the trailer it is desired that initially during a turn the base move along the track to its limit of movement before the pivot plate 30 pivots or rotates with respect to base 20, in some situations it may be desirable to limit sliding along the track, such as during braking or in backing up. In such situations, it will usually be desirable to limit sliding of the base along the track, and instead, to maintain the base centered with respect to the track and the towing vehicle. For this purpose, slip promoting and slip resisting material can be positioned on the track and/or on the sleeves mounting the base to the track in such a manner that in certain situations sliding along the track is promoted while in other situations sliding along the track is resisted. For example, as shown in FIG. 8, a slide promoting material 62, such as a slippery plastic such as nylon, can be placed along the track 44 to promote slipping of the sleeve 46 along the track. The slip promoting material 62 can be secured to either the track 44 or the sleeve 46, or a piece of slip promoting material could be secured to each of the track 44 and sleeve 46 to interface and slide on one another. In the embodiment shown, the slip promoting material 62 is positioned along about three quarters of the width of each of the four surfaces of the substantially square track 44. A slip resisting material 64, such as an abrasive material, is positioned adjacent the slip promoting material along the other one quarter of each side of the track 44. With the substantially square track 44, unless the trailer and towing vehicle are perfectly balanced and at the same height so that the trailer tongue and trailer hitch are level, which will seldom be the case, the pivot connection at the ball will tend to move upwardly, tending to rotate the sleeve 46 in FIG. 8 counterclockwise with respect to the track 44 as the towing vehicle is pulling the trailer forwardly thus putting the pulling force against the slip promoting material 62 along the track. When braking or backing, the connection between the trailer and ball will tend to go down rotating the sleeve clockwise on the track and putting the braking or pushing force against the slip resisting material. In this way, sliding along the track is promoted during pulling of the trailer and sliding along the track is resisted during braking or backing.

If the track is round with a cylindrical sleeve sliding thereon, the sleeve will rotate around the track as the connection between the trailer and towing vehicle moves up and down. With such a round track and with the track secured to the attachment means as in the illustrated embodiment, the slip promoting material may be positioned along the front side of the track, i.e., the side of the track toward the towing vehicle, and the slip resisting material may be positioned along the rear side of the track. During pulling of the trailer, the pulling force is against the forward side of the track and the sleeve, and during braking or backing, the braking or pushing force is against the back of the track and the sleeve. Thus, sliding of the sleeve along the track is promoted during pulling of the trailer and sliding of the sleeve along the track is resisted during braking and backing. If the track is secured to the base rather than the attachment means, the forces during pulling and braking and backing are on the opposite sides of the track and sleeves so the positioning of the slip promoting and slip resisting materials will be reversed.

FIGS. 9-11 show a second embodiment of the invention. In this embodiment, attachment bar extensions 65 and 66 extend outwardly at angles from attachment bar 68 which is adapted to be inserted into a standard hitch receiver 70 attached to a towing vehicle in normal manner as with attachment bar 40 of the embodiment of FIGS. 1-8. The attachment bar 68 and attachment bar extensions 65 and 66 form a Y-shaped attachment bar. A track 72 is secured to the attachment bar between the ends of attachment bar extensions 65 and 66. A sleeve 74, secured to base 76, slidably surrounds the track 72 so is slidable therealong between abutment with attachment bar extension 65 in one direction of sliding travel and abutment with attachment bar extension 66 in the opposite direction of sliding travel. Again, a conventional trailer hitch ball 78 with ball base 79 is secured to base 76 by the usual threaded stud 80 extending from ball base 79 of hitch ball 78 and passing through a receiving hole 81 in base 76. A sleeve 82 is positioned around the upper portion of the stud 80 between the bottom of ball base 79 and the upper surface 83 of base 76 to raise hitch ball 78 above the upper surface 83 of base 76. A nut 84 is tightened against the lower surface 85 of base 76 to sandwich base 76 between nut 84 and sleeve 82 to secure hitch ball 78 to base 76. A V-shaped base interface plate 86 with V-shaped base interface sliding surface 87 is secured to sleeve 74 and to base 76 to form its V-shaped sliding surface over sleeve 74.

Pivot plate 90 includes a downwardly projecting V-shaped pivot plate interface plate 91 with V-shaped pivot plate interface surface 92 which rests on the V-shaped base interface plate sliding surface 87 of V-shaped base interface plate 86. Pivot plate 90 is pivotally mounted to pivot about connector hitch ball 78 by passing sleeve 82 through a receiving hole 93 in pivot plate 90. Sleeve 82 then acts as a pivot pin or pivot shaft about which the pivot plate 90 can rotate. Pivot plate 90 can also slide up and down along sleeve 82. Pivot plate 90 includes a channel 94 projecting from its upper surface which provides two upright side flanges 95 which are spaced apart to receive therebetween the tongue of a trailer to be towed, not shown, when the tongue is coupled to hitch ball 78 in normal manner. With the trailer tongue received between side flanges 95, pivot plate 90 will rotate with the trailer tongue about ball 78 any time that the trailer tongue rotates about ball 78 when being towed. Means will usually also be provided, such as the spring loaded hinged flap 58 of FIG. 1, to provide a downward force on pivot plate 90 toward base 76, although such means is not shown here.

Operation of this embodiment is similar to that of the embodiment of FIGS. 1-8. With the hitch secured to the towing vehicle, the socket at the front of a trailer tongue is received on hitch ball 78 in normal manner. Again, with a trailer attached, the pivot plate 90 will generally be urged downwardly toward the base 76 so that V-shaped pivot plate interface surface 92 will rest against V-shaped base interface plate surface 87. The respective V-shapes will bias V-shaped pivot plate interface surface 92 to the center of V-shaped base interface plate surface 87 to bias pivot plate 90 to a centered position with respect to base 76. Any rotation of the trailer tongue with respect to the towing vehicle will cause rotation of pivot plate 90 with respect to base 76. This will cause V-shaped pivot plate interface surface 92 to move up one or the other of the sloped sides of V-shaped base interface plate surface 87. The downward force of the pivot plate with respect to the base will resist movement of V-shaped pivot plate interface surface 92 up a side of V-shaped base interface plate surface 87, and thereby resist relative rotation or pivoting of pivot plate 90 with respect to base 76. It will also tend to move pivot plate 90 back to centered position with respect to base 76 if relative rotation between the two does occur. The resistance to relative rotation of the pivot plate with respect to the base will initially, during a turn of the towing vehicle with respect to the trailer, cause the base and pivot plate to slide as a unit along track 72. This will move the effective pivot point between the trailer and towing vehicle forwardly of the rear of the towing vehicle to again simulate the positioning of the pivot point of a fifth wheel trailer hitch system.

In this embodiment of FIGS. 9-11, the track 72 is shown as arcuate, although the track could also be straight as in the embodiment of FIGS. 1-8. Conversely, the curved track of the embodiment of FIGS. 9-11 could be provided extending directly outwardly from attachment bar 40 instead of the straight track segments 44 and 45 of FIGS. 1-7. When curved or arcuate track is used, the radius of curvature of the arcuate track, such as track 72, is preferably about equal to or greater than the distance between the hitch ball 78 and the rear axle of an expected towing vehicle. In such situation, when turning of the towing vehicle and trailer results only in lateral movement of the universal connector along the track, the effective point of rotation between the vehicle and trailer being towed has been moved from behind the towing vehicle to about or ahead of the rear axle of the towing vehicle to simulate the fifth wheel towing system. The straight track appears to provide a similar result.

Track 72 is shown as being cylindrical with sleeve 74 surrounding cylindrical track 72 to slide therealong. With track 72 being arcuate and with the sleeve 82 also being arcuate and of a length so that it extends along track 72 for at least a short arcuate distance, sleeve 82 will not freely rotate with respect to track 72. Instead, rotation of sleeve 82 with respect to track 72 will cause binding of the sleeve and track. This can provide the same beneficial results of promoting and resisting sliding along the tracks as previously indicated or promotion and resisting of sliding along such tracks can be provided by slip promoting and slip resisting materials as on the straight tracks. Further, slip promoting and slip resisting materials can be provided between the track and sleeve of any track and sleeve embodiment to create desired characteristics of sliding and resistance to sliding for the hitch.

Whereas the invention is here illustrated and described with reference to embodiments thereof presently contemplated as the best mode of carrying out the invention in actual practice, it is to be understood that various changes may be made in adapting the invention to different embodiments without departing from the broader inventive concepts disclosed herein and comprehended by the claims that follow.

I claim:

1. A trailer hitch for a vehicle comprising:
   attachment means for attaching the hitch to a vehicle;
   a base mounted on the attachment means;
   a universal pivot connector secured to the base for mating connection to a tongue of a trailer to be connected to the vehicle; and
   a pivot plate mounted to pivot about the universal pivot connector with the trailer tongue when the trailer tongue is in mating position with the pivot connector, said pivot plate being mounted with respect to the base to be biased to a preset position with respect to the base and to resist rotation of the pivot plate and trailer tongue away from the preset position wherein the base includes a base sliding surface and the pivot plate includes a pivot plate sliding surface which contacts and slides on the base sliding surface to resist movement of the pivot plate from the preset position with respect to the base.

2. A trailer hitch for a vehicle according to claim 1, wherein the base sliding surface is a pair of oppositely sloped surfaces.

3. A trailer hitch for a vehicle according to claim 2, wherein the pair of oppositely sloped surfaces form a V-shaped base sliding surface.

4. A trailer hitch for a vehicle according to claim 2, wherein the pivot plate sliding surface is a V-shaped pivot plate sliding surface received in the V-shaped base sliding surface.

5. A trailer hitch for a vehicle according to claim 2, wherein the pair of oppositely sloped surfaces form the opposite sides of a slot, and wherein the pivot plate sliding surface is a projection of the pivot plate which projects into the slot.

6. A trailer hitch for a vehicle according to claim 5, wherein the projection is of V-shape.

7. A trailer hitch for a vehicle according to claim 1, additionally including means for biasing the pivot plate toward the base so that the pivot plate sliding surface will contact and slide on the base sliding surface during movement of the pivot plate from the preset position with respect to the base.

8. A trailer hitch for a vehicle according to claim 7, wherein the means for biasing the pivot plate toward the base is a spring loaded flap between the pivot plate and a trailer tongue of a trailer to be towed when the trailer tongue is attached to the universal connector.

9. A trailer hitch for a vehicle according to claim 1, wherein the base is mounted on the attachment means to allow limited lateral movement of the base with respect to the attachment means.

10. A trailer hitch for a vehicle according to claim 9, wherein the base is mounted on the attachment means through a track.

11. A trailer hitch for a vehicle according to claim 10, wherein a track is secured to the attachment means and the base is slidably mounted on the track.

12. A trailer hitch for a vehicle according to claim 11, wherein the universal pivot connector is a ball.

13. A trailer hitch for a vehicle according to claim 12, wherein the attachment means is an attachment bar adapted to be received in a hitch receiver attached to the vehicle.

14. A trailer hitch for a vehicle according to claim 13, wherein the attachment bar forming the attachment means extends rearwardly from the vehicle and the track extends substantially perpendicularly to the attachment bar on opposite sides of the attachment bar.

15. A trailer hitch for a vehicle according to claim 14, wherein the base includes sleeves that surround and slide on the track to slidably mount the base on the track, and additionally including slip resistant material between the track and the sleeves to interface and resist sliding of the base on the track when pressure is applied to the slip resistant material.

16. A trailer hitch for a vehicle according to claim 15, wherein the slip resistant material is arranged to interface and resist slipping when the towing vehicle slows down, brakes, or backs up to push the trailer.

17. A trailer hitch for a vehicle according to claim 16, additionally including slip promoting material between the track and the sleeves to interface and promote sliding of the base on the track when pressure is applied to the slip promoting material.

18. A trailer hitch for a vehicle according to claim 17, wherein the slip promoting material is arranged to interface and promote slipping when the vehicle is moving forward to pull the trailer.

19. A trailer hitch for a vehicle according to claim 14, wherein the base includes sleeves that surround and slide on the track to slidably mount the base on the track, and additionally including slip promoting material between the track and the sleeves to interface and promote sliding of the base on the track when pressure is applied to the slip promoting material.

20. A trailer hitch for a vehicle according to claim 19, wherein the slip promoting material is arranged to interface and promote slipping when the vehicle is moving forward to pull the trailer.

21. A trailer hitch for a vehicle according to claim 13, wherein the attachment bar of the attachment means extends rearwardly from the vehicle and includes attachment bar extensions extending rearwardly at an angle from the attachment bar, and wherein the track extends between the attachment bar extensions.

22. A trailer hitch for a vehicle according to claim 21, wherein the track is arcuate.

23. A trailer hitch for a vehicle according to claim 22, wherein the vehicle has a rear axle and wherein the radius of the arc of the arcuate track is at least about equal to the distance from the rear axle to the pivot connector.

* * * * *